United States Patent Office 3,438,889
Patented Apr. 15, 1969

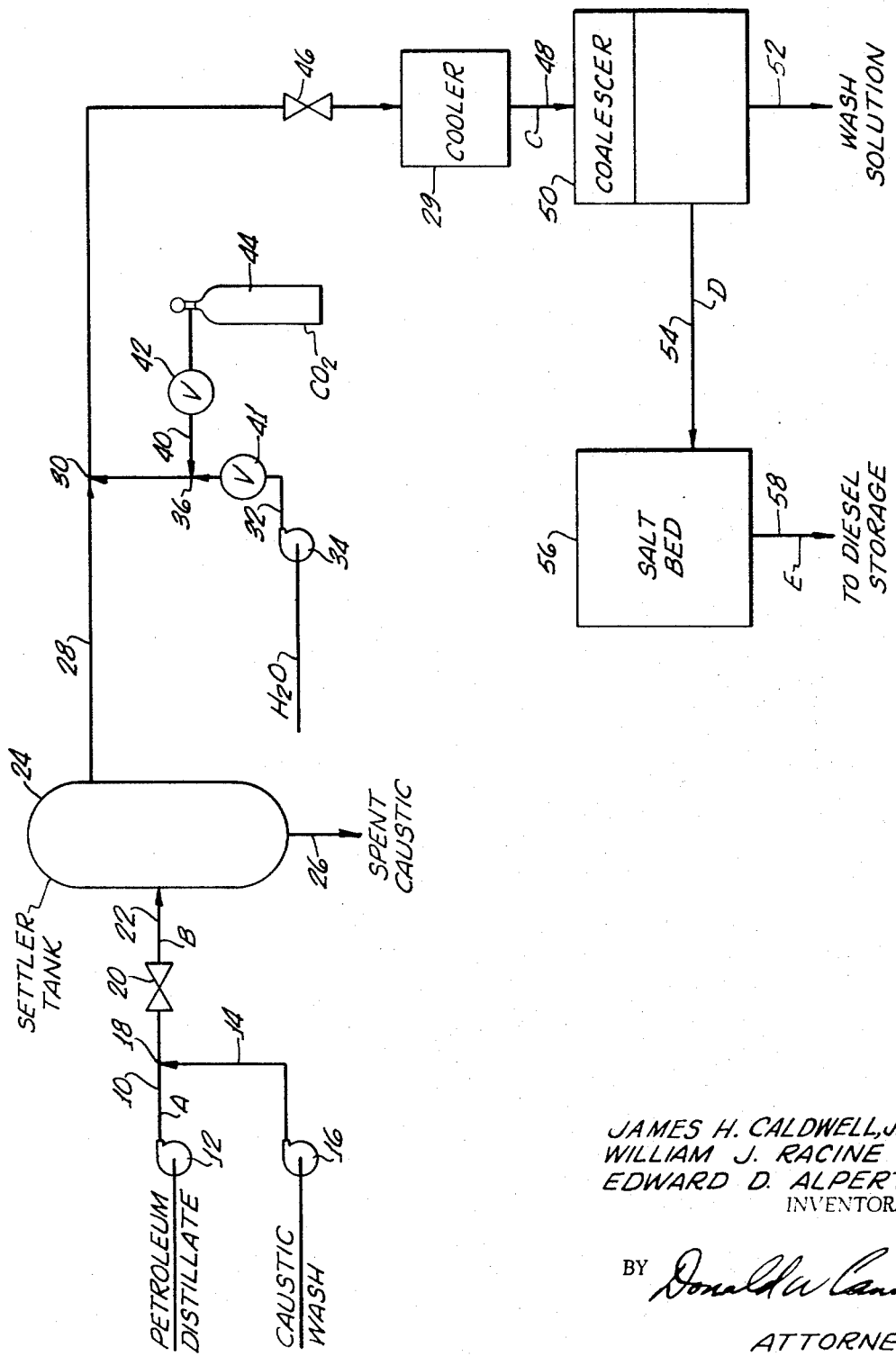

3,438,889
RESULFURIZATION OF PETROLEUM
HYDROCARBON
William J. Racine, Los Alamitos, Edward D. Alpert, Arcadia, and James H. Caldwell, Jr., Manhattan Beach, Calif., assignors to Atlantic Richfield Company, Philadelphia, Pa., a corporation of Pennsylvania
Filed Aug. 24, 1966, Ser. No. 574,637
Int. Cl. C10g 31/14, 19/02, 17/02
U.S. Cl. 208—263     12 Claims

ABSTRACT OF THE DISCLOSURE

A process for de-hazing hydrocarbon fuels comprising the steps of treating the hydrocarbon with caustic, separating the caustic solution therefrom, treating the separated hydrocarbon with carbonic acid, and separating the aqueous phase therefrom is disclosed.

This invention relates to the treatment of petroleum hydrocarbons to remove water, acids, and alkali metal salts entrained therein and is particularly directed to a process for removing emulsion precursors from diesel oil or stove oil which has been treated with a caustic wash to remove acids, and to the product produced by such treatment.

Napthenic and other acids reduce the color stability and corrosion characteristics of diesel and other midbarrel distillates and their presence reduces the commercial acceptability of the product and increases its water hazability. It is conventional procedure to treat diesel, other mid-barrel petroleum products, and some crude oils such as certain California petroleums, with an aqueous caustic wash to remove naphthenic and other acids. Undesirable retention of portions of the wash as an emulsion with a caustic washed petroleum distillate gives the distillate a hazy appearance rendering it commerically less acceptable. Trace quantities of sodium naphthenate and other alkali metal soaps, formed by reactions between the caustic wash and the naphthenic or other acids, act as surfactants and stabilize the emulsion of water in the oil. Due to the action of the surfactant soaps, the water cannot be removed mechanically or with commercial coalescers or coalescer salts without extreme difficulty and expense. Although the emulsion is not perfect and will settle after long periods of time if the naphthenate salts are not removed, contact of the oil with water at a later time produces a new stable emulsion and rehazes the oil.

Naphtenic acid per se is readily miscible in petroleum hydrocarbons and does not stabilize the water-oil emulsion. Consequently, attempts have been made to acidify the alkali metal soaps formed during the caustic wash treatment to reform small quantities of naphthenic acids so that the aqueous portion of the wash can be removed by conventional coalescers with very small amounts of the naphthenic acids being retained in the oil. A typical atempt at such treatment is exemplified in U.S. Patent No. 2,980,606 to Van Beest et al. In the Van Beest et al. process, an alkali-washed petroleum hydrocarbon is treated with sulfuric acid to acidify the dispersed naphthenates to their acid form. The use of a strong acid such as sulfuric, however, produces new impurities in the oil, as acknowledged in the patent, and requires a subsequent treatment with an aqueous basic solution to neutralize retained sulfuric acid. The aqueous basic solution treatment of Van Beest et al. is given after coalescing and settling of the oil so that the sulfuric acid is not nuetralized prior to removal of the retained alkali soaps. Consequently, such treatment requires additional mixing, settling and coalescing apparatus. Further, this prior art process produces a small amount of mercaptan sulfur compounds which are retained in the oil after the sulfuric acid treatment.

Another problem encountered in the foregoing type treatment is that sulfuric acid and similar acids cause severe corrosion of the treating equipment and lines, which makes the process expensive, dangerous, and commerically not feasible.

Accordingly, one object of this invention is to provide a novel method for reducing the hazy appearance of caustic-washed diesel oil by treatment thereof.

Another object of this invention is to provide a novel method for producing a bright, clean, relatively dry product from a caustic-washed petroleum hydrocarbon.

Still another object of this invention is to provide a method for reducing the water content and alkali content of a petroleum hydrocarbon and for improving its resistance to water haze without increasing its acid number.

A further object of this invention is to provide a low cost, quick, and simple method for removing retained caustic-wash products from petroleum hydrocarbons with a minimum number of treating steps and with a non-corrosive emulsion-breaking agent.

A further object of this invention is to provide a method for treating caustic-washed petroleum distillate product to remove entrained caustic wash solution from the oil in a single treating step by acidifying alkali metal soap surface active agents contained therein.

Still another object of this invention is to provide a method for treating a continuously moving stream of petroleum distillate product which has been subjected to a caustic wash.

Other objects and novel features of the present invention will become more fully apparent from the appended claims and from the ensuing detailed description and discussion as it proceeds in conjunction with the accompanying drawing which shows diagrammatically the treating system of this invention.

Briefly this invention comprises the process of injecting carbon dioxide and water under pressure into a moving stream of petroleum hydrocarbon that has been treated with an aqueous caustic solution, thoroughly mixing the carbon dioxide and water mixture with the hydrocarbon stream, passing this mixed stream through a mechanical coalescer to separate the aqueous portion of the mixed stream from the petroleum hydrocarbon portion and then passing the hydrocarbon stream through a salt bed to further separate the petroleum hydrocarbon portion from the aqueous portion and provide a clean, bright, nonhazy petroleum hydrocarbon.

As shown in the drawing, the treating system of this invention comprises a petroleum distillate conduit line 10 through which the distillate is pumped by means of a pump 12 from a source of distillate such as a crude still. An aqueous caustic wash solution may be pumped along connecting conduit line 14 by means of pump 16 and may be injected into the petroleum line at junction 18. The wash solution while generally sodium hydroxide may be any alkali solution and may contain not only the free alkali metal hydroxide but also the reaction products of that material with weak organic acids.

The petroleum distillate and caustic wash are thoroughly mixed at an emulsifier or mixing valve 20 and then fed through line 22 into an emulsion breaker or settler tank 24 which breaks most of the emulsion of caustic solution and petroleum distillate oil. Conventionally, electrostatic precipitators, such as Petreco treaters, or gravity settling units are used for breaking the oil-caustic solution emulsion and separating the hydrocarbon from the aqueous phase. Normally, in distillate treatment processes, this is the only emulsion-breaking step for separating the retained caustic solution from the distillate material.

After treating the caustic solution and distillate in emulsion breaker 24, the separated spent caustic solution may be fed through a conduit 26 to a recirculation system or discarded. The distillate hydrocarbon which still contains an emulsion of small quantities of the caustic solution carried over passes through a distillate conduit 28 to a cooler 29. Conduit 28 is in fluid communication at junction 30 with a treating conduit 32 through which a mixture of water and carbon dioxide may be injected into conduit 28. The water may be pumped through conduit 32 by means of pump 34 and carbon dioxide may be injected into the water stream at junction 36 through a conduit 40 from a carbon dioxide source such as cylinder 44. Alternatively, the carbon dioxide can be generated as a byproduct in another process and pumped directly into line 32 to form a mixture with the water which is then injected at inlet 30 into conduit 28. Any convenient source of carbon dioxide or solution of carbonic acid can be used. The carbon dioxide and water ratios may be controlled by means of valves 41 and 42, respectively. The carbonic acid formed is regulated to be sufficiently strong to acidify surface active alkali metal soaps which stabilize the emulsion. The acidification of sodium naphthenate soaps is accompanied by the formation of naphthenic acid and sodium carbonate-water solution which can be separated from the distillate with relative ease. To insure thorough acidification of these soaps, a mixing valve or emulsifier 46 may be provided in conduit 28 as shown in the drawing. Alternatively, cooler 29 may be designed to provide sufficient agitation during the cooling of the distillate for acidification of the soaps. Some beneficial acidification will occur even though no mixing device is used.

Water is soluble in the hydrocarbon. At cooler 29, the temperature is reduced to lower the water content. At this point, there is no caustic left since it has been neutralized. The cooler 29 reduces the oil to approximately storage temperature so no additional water will precipitate after the oil leaves the unit. When the alkali is not neutralized, the water precipitated by cooling forms a haze very difficult to remove.

From cooler 29, the solution is advanced by means of conduit 48 into coalescer unit 50 which may contain a series of glass wool or excelsior coalescers for separating from the distillate the aqueous solution containing sodium carbonate and a portion of the reformed naphthenic acids. The wash solution is emitted from coalescer 50 through conduit 52 which may lead to a recycling system or be discarded as previously explained with respect to conduit 26. The distillate portion is fed through conduit 54 into a salt bed unit 56 and then conducted through conduit 58 to an appropriate diesel storage unit (not shown). Distillate product removed from the salt bed after treatment with carbonic acid is nonhazy, noncorrosive, bright, and clean in appearance and has a resistance to rehaze with water much greater than caustic washed-distillate products not treated with the carbon dioxide-water mixture.

Using the foregoing treating method and diagram, it has been found that the time for cleaning the petroleum hydrocarbon product has been reduced and the quality of the product has been increased. Table 1 illustrates the amount of increase in the appearance and process efficiency of a diesel oil which was treated in the laboratory and pilot plant by the foregoing process in apparatus as described in Examples I and II.

Example I

A diesel petroleum distillate with an API gravity of 32.3, a boiling range of 360–675° F. and a flash point of about 164° F. was treated in a commercial caustic wash under the following operating conditions:

| | | |
|---|---|---|
| Oil feed rate | b./hr | 750 |
| Caustic feed rate | g.p.m | 8 |
| Caustic injection pressure | p.s.i. | 13 |
| Emulsion breaker pressure | p.s.i.g. | 45 |
| Coalescer pressure drop | p.s.i. | 6 |
| Salt tower pressure | p.s.i.g. | 26 |
| Caustic mix temperature | ° F. | 146 |
| Cooler out temperature | ° F. | 98 |
| Coalescer velocity | ft./min | 9.9 |
| Salt tower velocity | ft./min | 0.45 |

At a point between the emulsion breaker and the cooler a special oil line for carrying about 2.25 barrels/hour of oil to a pilot plant was connected, a water-carbon dioxide mixture was injected into the oil stream flowing through this special line and the oil was then passed through a separate coalescer and salt tower under the following conditions:

| | | |
|---|---|---|
| Oil feed rate | b./hr | 2.25 |
| Water rate | g.p.m | 0.075 |
| $CO_2$ rate | s.c.f./hr | 8.6 |
| Feed pressure | p.s.i.g. | 36 |
| Water mixture | p.s.i. | 5 |
| $CO_2$ injection pressure | p.s.i. | 7 |
| Coalescer pressure drop | p.s.i. | 1 |
| Salt tower pressure drop | p.s.i. | 4 |
| Temperature | ° F. | 98 |
| Coalescer velocity | ft./min | 1.05 |
| Salt tower velocity | ft./min | 1.05 |

The laboratory analysis for sodium content, water content and appearance are shown in Table 1 for both the portion of the oil to which carbon dioxide and water were added and the portion treated with the caustic wash only. As can be seen, the water content of the portion which received the caustic wash only was about 32% higher than that of the portion treated with the carbon dioxide and water solution. Additionally, the sodium content of the caustc-washed-only portion was more than 20 times that of the treated portion.

Example II

A second commercial unit run was made on diesel oil distillate as in Example I under the following conditions:

| | | |
|---|---|---|
| Feed rate | b./hr | 825 |
| Caustic rate | g.p.m | 9.0 |
| Caustic injection pressure | p.s.i. | 7 |
| Precipitator pressure | p.s.i.g. | 50 |
| Coalescer pressure drop | p.s.i. | 7 |
| Aft. salt tower pressure | p.s.i.g. | 30 |
| Caustic mix temperature | ° F. | 145 |
| Cooler out temperature | ° F. | 100 |
| Coalescer velocity | ft./min | 10.9 |
| Salt tower velocity | ft./min | 0.50 |

As in Example I, a portion of the caustic treated oil was channeled into a special line which in this run carried approximately 2.5 barrels of oil per hour and was connected to a separate low capacity coalescer and salt tower.

In this test, however, carbon dioxide was injected directly into the oil under the following conditions:

| | |
|---|---|
| Oil feed rate _____ b./hr__ | 2.50 |
| $CO_2$ rate _____ s.c.f./hr__ | 17.1 |
| Oil feed pressure _____ p.s.i.g__ | 40 |
| $CO_2$ injection pressure _____ p.s.i__ | 20 |
| Coalescer pressure drop _____ p.s.i__ | 2 |
| Salt tower pressure drop _____ p.s.i__ | 5 |
| Temperature _____ ° F__ | 100 |
| Coalescer velocity _____ ft./min__ | 1.18 |
| Salt tower velocity _____ ft./min__ | 1.18 |

The values for sodium content, water content, and appearance of the treated distillate are given in Table 1. In this laboratory run, the decrease in sodium and water content was about the same as in Example I. The final oil appeared clear, dry and nonhazy as in Example I. Again that portion of the oil not channeled into the special line was hazy and had a high sodium content.

TABLE 1

| Property of treated distillate | Example I | Example II | Caustic wash only |
|---|---|---|---|
| Water content (Karl Fischer) _____ | 125 | 125 | 165 |
| Sodium content, p.p.m _____ | 0.2 | 0.1 | 4.8 |
| Appearance _____ | Clear | Clear | Hazy |

Example III

A mixture of carbon dioxide and water was injected into a diesel oil having a boiling point of between 371–618° F., a flash point of about 164° F. and an API gravity of about 32.2, in a commercial production line and the oil feed rate was gradually increased from 570 barrels/hour to 735 barrels/hour during an 8-hour period in accordance with the following operating conditions:

| | Start | 4 hours | 8 hours |
|---|---|---|---|
| Feed rate, B/hr _____ | 570 | 685 | 735 |
| Caustic rate, g.p.m _____ | 6 | 6 | 6 |
| Caustic injection pressure, p.s.i.g ____ | 23 | 35 | 38 |
| Emulsion breaker pressure, p.s.i.g __ | 43 | 56 | 49 |
| Aft. salt tower pressure, p.s.i.g _____ | 26 | 33 | 27 |
| Caustic mix temperature, ° F _____ | 146 | 148 | 137 |
| Coalescer velocity, ft./min _____ | 7.55 | 9.1 | 9.7 |
| Salt tower velocity, ft./min _____ | 0.34 | 0.41 | 0.44 |

The water injection control valve (valve 41 of drawing) was opened approximately 15 minutes after the test was started to clear injection line 32 and the carbon dioxide injection valve 42 was opened approximately 1 hour later. Samples taken at 1 hour intervals from conduit 48, at the exit end of the cooler (see cooler 29 of drawing), showed a decrease in the sodium content in the oil portion from 12.7 p.p.m. by weight to 0.2 p.p.m. by weight over the 8-hour period. The lowest sodium content was observed when the waste water from the coalescer exhibited a pH of about 8.5.

Example IV

A second run with diesel oil as in Example III was made on the commercial production line over a 16-hour period with a diesel feed rate of approximately 800 barrels/hour and a 7.5° Baumé caustic solution feed rate of about 8.5 gallons/minute. The carbon dioxide feed rate was maintained at approximately 165 cubic feet per hour (standard conditions) and the water flow rate was varied from 5.5 to 8.5 barrels/hour during the first three hours and then maintained at a constant rate of 3 barrels/hour maintaining the coalescer waste water pH at about 8.0.

Comparative analysis of the sodium concentration remaining in the oil, the acid number of the oil, the appearance of the oil and its corrosiveness were determined at regular time intervals by drawing samples at various locations along the system as designated A through E in the drawing, allowing the sample to settle, and analyzing the oil portion of each sample. The comparative data is shown in Table 2 wherein the "start" data indicates the first test sample drawn which was 2 hours after beginning injection of carbon dioxide into the oil. The times for the remaining test samples are as indicated in hours after the first sample.

TABLE 2

Sodium content, p.p.m., location

| Time | A | B | C | D | E |
|---|---|---|---|---|---|
| Start _____ | 0.2 | 12.0 | 12.3 | 27.6 | 23.9 |
| 4 _____ | 0.2 | 3.1 | 3.1 | 0.5 | 4.3 |
| 8 _____ | 0.2 | 5.2 | 5.8 | 0.2 | 0.4 |
| 12 _____ | 0.2 | 4.5 | 4.1 | 0.2 | 0.2 |
| 16 _____ | 0.2 | 4.3 | 0.9 | 0.2 | 0.2 |

Acid number—mg. KOH/gram, location

| | A | B | C | D | E |
|---|---|---|---|---|---|
| Start _____ | 0.39 | 0.02 | 0.02 | 0.08 | 0.09 |
| 4 _____ | 0.40 | 0.03 | 0.06 | 0.07 | 0.06 |
| 8 _____ | 0.41 | 0.02 | 0.02 | 0.03 | 0.04 |
| 12 _____ | 0.42 | 0.02 | 0.01 | 0.02 | 0.02 |
| 16 _____ | 0.46 | 0.02 | 0.03 | 0.05 | 0.03 |

The appearance of each sample drawn was observed and the relative ease with which the water could be separated from the oil was determined for each sample by the following Rehaze test developed by E. D. Alpert. A quart of the distillate was agitated for 5 minutes with 4 ml. of distilled water. After settling for 5 minutes, the hazy distillate was then pressured through a glass wool coalescing pad. The first 400 ml. were discarded and a 4 ounce bottle of the filtered distillate was collected and examined to determine whether the top of the bottle could be seen by looking through the bottom. If the top could be seen the distillate was considered to have passed the test and graded with a P. Those samples in which the top could not be seen were considered to have failed the Rehaze test and given an F grading. The degree of "failing" was further graded on a scale of 1 to 4 with 4 indicating the most severe failure. The results of the Rehaze tests are presented for the various samples in Table 3.

TABLE 3.—REHAZE TEST LOCATION

| Time | A | B | C | D | E |
|---|---|---|---|---|---|
| Start _____ | F[1] | P | P | P | F[4] |
| 4 _____ | P | F[1] | F[1] | P | F[4] |
| 8 _____ | P | P | F[1] | P | P[2] |
| 12 _____ | P | P | P | P | P |
| 16 _____ | P | F | F[2] | P | P |

Further tests showed that treatment of a diesel oil with carbonic acid formed by premixing carbon dioxide with water produced an oil which was clear in appearance, which had a sodium content of less than approximately .05 p.p.m. and an acid number of about 0.05 mg. KOH/g. In comparison a nontreated, caustic-washed oil of the same composition was visually hazy, had a sodium content of 4.0 p.p.m. and an acid number of 0.05. A further comparison of the nontreated and treated oil showed that the water content of a nontreated oil, as determined by the Karl Fischer method, was 480 whereas the oil treated by the process of this invention had a Karl Fischer water content of 100.

It has been found that best results are obtained when soft water is used to form carbonic acid with carbon dioxide in the treating process of this invention.

While diesel oil has been primarily discussed as the material being treated, any crude petroleum or distillate which, after an aqueous caustic wash, forms a difficult to break emulsion with water due to the surfactant properties of retained alkali metal salts, such as sodium naphthenate, can be treated by the process of this invention. For example, the process has also been found especially beneficial for treatment of stove oil having a boiling point of from 320–550° F. Additionally, while the discussion has been mainly directed to treatment with a premixture of carbon dioxide and water formed by flowing a stream of water and injecting carbon dioxide into the water stream, any manner of premixture of the carbon dioxide with the water prior to injection into the distillate line has been found to be satisfactory to produce a bright appearing, dry distillate product. Direct injection of carbon dioxide into the distillate line either by gaseous means or by putting Dry Ice in the distillate line, while shown to be operable in the laboratory, (see Example II) has been found to be relatively inefficient in eliminating the retained water from the distillate product in the production line where flow rates are higher. Accordingly, the premixture of water and carbon dioxide prior to injection into the oil line is preferred. Direct injection of carbon dioxide into the distillate line, while producing some improvement of the distillate characteristics, is most beneficial when the distillate initially has a high water content and its flow rate is relatively low.

It has been determined that a premixture of carbon dioxide in water allows ionization of the carbon dioxide to form carbonic acid before injection into the oil line. The carbonic acid then acidifies the alkali metal soaps acting as surfactants in the oil allowing the emulsion to be broken and the water to be separated from the oil. The ionization of carbon dioxide and water to form carbonic acid is promoted by the premixture of these materials and probably accounts for the noticeably better results.

An examination of the treating equipment, the pipelines and pumps after using the premixed carbon dioxide-water solution in the production line and in the laboratory showed that practically no corrosion had taken place. Similar tests with other acids such as sulfuric and acetic showed a very high corrosion rate.

It has been found that the carbon dioxide concentration can best be controlled by observing the pH of the coalescer waste water. Satisfactory results have been obtained when the carbon dioxide flow ratio is adjusted to maintain the coalescer waste water pH in the range of from 5–9.0. The preferred carbon dioxide flow rate is that sufficient to maintain the coalescer waste water at a pH of from 8 to 9 with an optimum pH of 8.5. The higher pH is preferred because of the economic benefits derived from operating at these levels.

The treating system of this invention is normally operated at pressures of from 35 to 50 p.s.i. although satisfactory results can be obtained when the pressure is varied from atmospheric pressure to greater than 100 p.s.i., the upper limit being defined by the construction of the treating system. Similarly, while the production line oil temperatures are normally from 135 to 150° F. at the point of injection of the carbon dioxide and water mixture, the mixture can be injected after the oil has been cooled to 90° F. or lower with favorable results.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:
1. A process for treating a stream which consists essentially of a major portion of petroleum hydrocarbons which contains a minor portion of acids as impurities comprising the steps of flowing a stream of said petroleum hydrocarbons with an aqueous caustic solution; separating said aqueous caustic solution containing the major portion of alkali metal soaps thus formed from the stream, adding to the resulting stream consisting essentially of petroleum hydrocarbons with very minor amounts of alkali metal soaps therein carbonic acid of sufficient strength to acidify said retained alkali metal soaps formed as reaction products of said acid impurities and said caustic solution to reduce formation of an emulsion between said hydrocarbons and retained portions of said caustic solution; and separating the acidified retained portions of said solution from said hydrocarbons.

2. The process of claim 1 wherein said carbonic acid is added by injecting carbon dioxide directly into said stream.

3. The process of claim 1 wherein said carbonic acid is added by injecting a carbon dioxide and water mixture into said stream.

4. The process of claim 3 wherein said stream is passed through a coalescer after injection of said carbon dioxide and water mixture and the amount of carbon dioxide added to said stream is controlled by regulating the pH of the waste water from said coalescer.

5. A process as defined in claim 4 wherein said waste water is maintained at a pH of from 5.0 to 9.0.

6. A process as defined in claim 5 wherein said waste water pH is about 8.5.

7. A process as defined in claim 3 wherein the water added in said carbon dioxide and water solution is a soft water and said carbon dioxide is added to said water under pressure.

8. A process as defined in claim 3 wherein said hydrocarbon is diesel oil having a boiling point of from 360–675° F.

9. A process as defined in claim 3 wherein said hydrocarbon is stove oil having a boiling point of from 320–550° F.

10. In a process for removing haze forming impurities from petroleum distillate materials of the type which consists essentially of hydrocarbons as a major component and organic acids as an impurity component, the improvement comprising the steps of:
  (a) intermixing said petroleum distillate material with a caustic solution to convert impurity acids to alkali metal soaps;
  (b) separating the major portion of the alkali metal soaps with the caustic solution from the hydrocarbon component;
  (c) intermixing the hydrocarbon component with carbonic acid to form alkali carbonates with retained caustic solution; and
  (d) separating the carbonic acid with said carbonates and retained acidified portions from said hydrocarbon component to produce a clear, bright, non-hazy petroleum hydrocarbon product.

11. The process of claim 10 wherein separating step (d) includes the step of:
  (e) coalescing the aqueous components prior to separation thereof from the hydrocarbon component.

12. The process of claim 11 wherein separating step (d) includes the step of:
  (f) passing the hydrocarbon component through a salt bed.

References Cited

UNITED STATES PATENTS

| | | | |
|---|---|---|---|
| 231,944 | 1926 | Thole et al. | 208—286 |
| 1,953,336 | 1931 | Campbell | 208—286 |
| 3,097,404 | 7/1963 | Downey | 23—63 |

DELBERT E. GANTZ, *Primary Examiner.*

J. D. MEYERS, *Assistant Examiner.*

U.S. Cl. X.R.

208—286

U.S. DEPARTMENT OF COMMERCE

PATENT OFFICE

Washington, D.C. 20231

UNITED STATES PATENT OFFICE
CERTIFICATE OF CORRECTION

Patent No. 3,438,889                                April 15, 1969

William J. Racine et al.

It is certified that error appears in the above identified patent and that said Letters Patent are hereby corrected as shown below:

In the heading to the printed specification, line 2, "RESULFURIZATION" should read -- DESULFURIZATION --. Column 1, line 30, "Napthenic" should read -- Naphthenic --; line 53, "Naphtenic" should read -- Naphthenic --. Column 4, line 54, "caustc" should read -- caustic --. Column 6, TABLE 3, sixth column, line 3 thereof, "P$^2$" should read -- F$^2$ --. Column 7, line 13, "i s" should read -- its --; line 67, "resul ing" should read -- resulting --.

Signed and sealed this 7th day of April 1970.

(SEAL)
Attest:

Edward M. Fletcher, Jr.                       WILLIAM E. SCHUYLER, JR.

Attesting Officer                                 Commissioner of Patents